United States Patent
Adam et al.

(10) Patent No.: US 9,948,973 B2
(45) Date of Patent: Apr. 17, 2018

(54) RECEIVING A BROADCAST STREAM

(75) Inventors: John Adam, Middlesex (GB); Arthur Simon Waller, Middlesex (GB); Richard Wells, Middlesex (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 532 days.

(21) Appl. No.: 13/525,964

(22) Filed: Jun. 18, 2012

(65) Prior Publication Data

US 2013/0007827 A1    Jan. 3, 2013

(30) Foreign Application Priority Data

Jun. 30, 2011   (GB) .................................... 1111154.9

(51) Int. Cl.
*H04N 21/41* (2011.01)
*H04N 21/4363* (2011.01)
(Continued)

(52) U.S. Cl.
CPC ... *H04N 21/4126* (2013.01); *H04N 21/43637* (2013.01); *H04N 21/44008* (2013.01); *H04N 21/8186* (2013.01); *H04N 21/8586* (2013.01)

(58) Field of Classification Search
CPC ........... H04N 5/44543; H04N 7/17318; H04N 21/4622; H04N 21/4126; H04N 21/43637; H04N 21/44008
(Continued)

(56) References Cited

U.S. PATENT DOCUMENTS

| | | | |
|---|---|---|---|
| 5,831,664 A | 11/1998 | Wharton et al. | |
| 2002/0093594 A1* | 7/2002 | Kikinis | G06K 9/2054 348/564 |

(Continued)

FOREIGN PATENT DOCUMENTS

| | | |
|---|---|---|
| CN | 101197985 A | 6/2008 |
| CN | 101296366 A | 10/2008 |

(Continued)

OTHER PUBLICATIONS

Communication, dated Dec. 19, 2012, issued by the European Patent Office in counterpart European Application No. 12170999.2.
(Continued)

*Primary Examiner* — Sumaiya A Chowdhury
(74) *Attorney, Agent, or Firm* — Sughrue Mion, PLLC

(57) ABSTRACT

An apparatus and method for receiving a broadcast stream is provided. The apparatus is configured to receive key information and additional information through the broadcast stream, select one of a plurality of predetermined functions based on the additional information, and perform the selected function in response to a control signal identified by the key information. The additional information may include link information such as a URL or telephone number, and the function may be selected based on a type of the link information. In some embodiments, the link information may be extracted from audio-visual data of a selected programme, using optical character recognition. The apparatus may connect to a secondary device to transmit information to the secondary device, and may receive information relating to the selected programme from the secondary device.

20 Claims, 7 Drawing Sheets

(51) Int. Cl.
*H04N 21/44* (2011.01)
*H04N 21/81* (2011.01)
*H04N 21/858* (2011.01)

(58) Field of Classification Search
USPC ............... 725/49, 51, 60, 110, 112, 113
See application file for complete search history.

(56) References Cited

U.S. PATENT DOCUMENTS

| | | | |
|---|---|---|---|
| 2003/0067484 A1* | 4/2003 | Moir ................. | G06F 17/30899 715/747 |
| 2004/0117309 A1* | 6/2004 | Inoue ................. | G06F 21/10 705/50 |
| 2005/0177861 A1 | 8/2005 | Ma et al. | |
| 2006/0259932 A1* | 11/2006 | Kim ................. | H04N 5/4403 725/100 |
| 2010/0115559 A1* | 5/2010 | Ellis ................. | H04N 5/44543 725/53 |
| 2010/0333144 A1 | 12/2010 | Pack et al. | |
| 2011/0145883 A1* | 6/2011 | Godar et al. ................. | 725/131 |
| 2011/0149156 A1 | 6/2011 | Tokumo et al. | |
| 2012/0254928 A1* | 10/2012 | Oztaskent et al. ............ | 725/110 |

FOREIGN PATENT DOCUMENTS

| | | |
|---|---|---|
| CN | 102090058 A | 6/2011 |
| EP | 1 329 044 A1 | 7/2003 |
| EP | 2 109 313 A1 | 10/2009 |
| JP | 2005-229492 A | 8/2005 |
| JP | 2006254379 A | 9/2006 |
| JP | 2006352565 A | 12/2006 |
| JP | 2007134765 A | 5/2007 |
| JP | 2008529332 A | 7/2008 |
| JP | 200931952 A | 2/2009 |
| JP | 2009-105915 A | 5/2009 |
| WO | 00/76217 A1 | 12/2000 |
| WO | WO00/76217 A1 * | 12/2000 ............. H04N 7/173 |
| WO | 02/11330 A1 | 2/2002 |
| WO | 03/088671 A1 | 10/2003 |
| WO | 2006079936 A1 | 8/2006 |

OTHER PUBLICATIONS

Communication, dated Oct. 21, 2011, issued by the Intellectual Property Office of Great Britain in counterpart British Application No. GB1111154.9.
Communication dated Jul. 12, 2016, issued by the Japanese Intellectual Property Office in counterpart Japanese Application No. 2012-147226.
Communication dated Jul. 13, 2016, issued by the State Intellectual Property Office of P.R. China in counterpart Chinese Application No. 201210222265.7.
Communication dated Mar. 10, 2013 issued by the European Patent Office in counterpart European Application No. 12 170 999.2.
Communication dated Mar. 2, 2017 by the State Intellectual Property Office of P.R. China in counterpart Chinese Patent Application No. 201210222265.7.
Communication dated Mar. 20, 2017 by the European Patent Office in counterpart European Patent Application No. 12170999.2.

* cited by examiner

| Syntax | Bits | Identifier |
|---|---|---|
| link_info() { | | |
|    link_type     210 | 4 | uimsbf |
|    reserved_future_use | 2 | bslbf |
|    how_related_classification_scheme_id | 6 | uimsbf |
|    term_id | 12 | uimsbf |
|    group_id | 4 | uimsbf |
|    precedence | 4 | uimsbf |
|    if (link_type == 0x00 \|\| link_type == 0x02) { | | |
|       media_uri_length | 8 | uimsbf |
|       for (k=0; k<media_uri_length; k++) { | | |
|          media_uri_byte | 8 | uimsbf |
|       }    220 | | |
|    } | | |
|    if (link_type == 0x01 \|\| link_type == 0x02) { | | |
|       dvb_binary_locator() | | |
|    } | | |
|    reserved_future_use | 2 | bslbf |
|    number_items | 6 | uimsbf |
|    for (m=0; m<number_items; m++) { | | |
|       ISO 639-2_language_code | 24 | bslbf |
|       promotional_text_length | 8 | uimsbf |
|       for (n=0; n< promotional_text_length; n++) { | | |
|          promotional_text_char | 8 | uimsbf |
|       } | | |
|    } | | |
|    default_icon_flag | 1 | bslbf |
|    icon_id | 3 | uimsbf |
|    descriptor_loop_length | 12 | uimsbf |
|    for (p=0; p<descriptor_loop_length; p++) { | | |
|       descriptor() | 8 | uimsbf |
|    } | | |
| } | | |

*FIG. 2*

| Syntax | No. of Bits | Mnemonic |
|---|---|---|
| activation_key_descriptor {<br>   descriptor_tag<br>   descriptor_length<br>   activation_key_code<br>} | <br>8<br>8<br>8 | <br>uimsbf<br>uimsbf<br>uimsbf |

| Syntax | No. of Bits | Mnemonic |
|---|---|---|
| second_device_descriptor { | | |
|    descriptor_tag | 8 | uimsbf |
|    descriptor_length | 8 | uimsbf |
|    target_device | 2 | uimsbf |
|    reserved | 6 | uimsbf |
| } | | |

RECEIVING A BROADCAST STREAM

CROSS-REFERENCE TO RELATED APPLICATION

This application claims priority from British Patent Application No. GB1111154.9, filed on 30 Jun. 2011 in the Intellectual Property Office of the United Kingdom, the disclosure of which is incorporated herein by reference.

BACKGROUND

Field

The present invention relates to an apparatus and method for receiving a broadcast stream. In particular, the present invention relates to receiving key information and additional information through the broadcast stream, selecting one of a plurality of predetermined functions based on the additional information, and performing the selected function in response to a control signal identified by the key information.

Description of the Related Art

In existing broadcast systems, such as MHEG and MHP, applications can be transmitted through a broadcast stream and executed by the receiver. The application may allow certain behaviour to be trigged by user input, but this has to be programmed into the application itself. Accordingly, the application has to be executed in order for the functionality to be available to a user. The launching of the broadcaster application may be done either in direct response to some signalling, such as that defined in TS 102 809, or via a menu or other UI provided by the manufacturer. Alternatively, a receiver may implement software that automatically runs applications provided by the broadcaster. This gives the broadcaster the ability to directly monitor for key presses and display a web page when the relevant key is pressed. However, as the entire application must be transmitted to the receiver in order to make use of this additional functionality, such systems require a large amount of data to be sent to the receiver. Also, there are often interoperability issues, as the receiver software does not always work in the same way.

SUMMARY

According to the present invention, there is provided an apparatus for receiving a broadcast stream, the apparatus comprising a receiving module configured to receive key information and additional information relating to a selected programme through the broadcast stream, the key information identifying one of a plurality of control signals, wherein the apparatus is configured to select one of a plurality of predetermined functions based on the additional information, and perform the selected function in response to the control signal identified by the key information.

The additional information may include information indicating a type of link information that is currently available for the selected programme, and the apparatus may be configured to select the function according to the type of the link information.

The apparatus may be configured to determine whether the link information is available through the broadcast stream as metadata, and to extract the link information from audio-visual data of the selected programme if the link information is not available through the broadcast stream.

The apparatus may be configured to extract the link information from audio-visual data of the selected programme by capturing a screen image and applying at least one of an Optical Character Recognition OCR algorithm and an image recognition algorithm to the captured screen image.

The extracted link information may comprise a plurality of information items, and the apparatus may be configured to display a user interface for selecting one of the plurality of information items.

When the link information is an Internet Uniform Resource Locator URL, the selected function may comprise receiving an application from a location defined by the URL and executing the application, or comprises connecting to the location defined by the URL and displaying a webpage from the location on a display.

Wherein when the link information is a telephone number, the selected function may comprise dialling the telephone number, or comprises sending a text message to the telephone number.

The apparatus may be a Digital Video Broadcasting DVB compliant receiver, and the key information and additional information may be included in a Related Content Table RCT received through the broadcast stream.

The link information may be included in a link_info fragment of the RCT, and the link information type may be specified by a how_related_classification_scheme_id field of the link_info fragment.

The additional information may include target device information identifying one or more devices on which the selected function is to be performed, wherein if the target device information identifies the apparatus, the apparatus may be configured to perform the selected function, and if the target device information identifies the secondary device, the apparatus may be configured to control the secondary device to perform the selected function.

The selected function may comprise executing a first application, and the apparatus may be configured only to control the secondary device to execute the first application if the apparatus is currently executing a second application related to the first application.

The apparatus may be connectable to a secondary device, and the selected function may comprise transmitting information relating to the selected programme to the secondary device.

The apparatus may be configured to identify the selected programme, and the information relating to the selected programme may comprise information identifying the selected programme.

The apparatus may be configured to identify the programme based on a currently tuned channel, a current date and time, and Electronic Program Guide EPG information about programmes available in the broadcast stream.

According to the present invention, there is also provided a system comprising the apparatus and the secondary device.

The secondary device may be configured to register with the apparatus in order to receive information from the apparatus, and the apparatus may be configured to only send information to the secondary device if it has registered to receive information.

The apparatus may be configured to record first audio and/or video data of the selected programme during a predetermined time period, and send the recorded first audio and/or video data to the secondary device, wherein the secondary device may include a microphone and/or camera, and may be configured to record second audio and/or video data during a time period corresponding to the predetermined time period, determine a correlation value between the second audio and/or video data and the first audio and/or video data received from the apparatus, and register with the apparatus to receive information if the correlation value is above a threshold value.

The secondary device may be configured to connect to the Internet to receive further information relating to the selected programme.

The secondary device may be configured to transmit the further information relating to the selected programme to the apparatus, and the apparatus may be configured to display the further information on a display.

When the information relating to the selected programme is a telephone number, the secondary device may be configured to dial the received telephone number and/or send a text message to the received telephone number.

When the information relating to the selected programme is an Internet Uniform Resource Locator URL, the secondary device may be configured to receive an application from a location defined by the URL and execute the application, or connect to the location defined by the URL and display a webpage from the location on a display According to the present invention, there is further provided a method comprising receiving key information and additional information through a broadcast stream, the key information identifying one of a plurality of control signals, selecting one of a plurality of predetermined functions based on the additional information, and performing the selected function in an apparatus for receiving the broadcast stream, in response to the control signal identified by the key information.

The additional information may include information indicating a type of link information that is currently available for the selected programme, and selecting one of the plurality of predetermined functions may comprise selecting the function according to the type of the link information.

The method may further comprise determining whether the link information is available through the broadcast stream as metadata, and extracting the link information from audio-visual data of the selected programme if the link information is not available through the broadcast stream.

Extracting the link information may comprise capturing a screen image and applying at least one of an Optical Character Recognition OCR algorithm and an image recognition algorithm to the captured screen image.

When the link information is an Internet Uniform Resource Locator URL, the selected function may comprise receiving an application from a location defined by the URL and executing the application, or may comprise connecting to a location defined by the URL and displaying a webpage from the location.

The additional information may include target device information identifying one or more devices on which the selected function is to be performed, wherein if the target device information identifies the apparatus, the selected function may be performed on the apparatus, and if the target device information identifies the secondary device, the selected function may be performed on the secondary device.

The selected function may comprise transmitting information relating to the selected programme to a secondary device.

The method may further comprise identifying the selected programme, wherein the information relating to the selected programme may comprise information identifying the selected programme.

Identifying the selected programme may comprise identifying the selected programme based on a currently tuned channel, a current date and time, and Electronic Program Guide EPG information about programmes available in the broadcast stream.

The secondary device may include a microphone and/or camera, and the method may further comprise recording first audio and/or video data of the selected programme during a predetermined time period, at the apparatus, sending the recorded first audio and/or video data to the secondary device, recording second audio and/or video data at the secondary device during a time period corresponding to the predetermined time period, determining a correlation value between the second audio and/or video data and the first audio and/or video data, and registering the secondary device with the apparatus to receive information if the correlation value is above a threshold value.

According to the present invention, there is further provided a computer-readable storage medium storing a computer program which when executed on a processor, causes the processor to perform the method.

BRIEF DESCRIPTION OF THE DRAWINGS

Embodiments of the present invention will now be described, by way of example only, with reference to the accompanying drawings, in which:

FIG. 2 illustrates the syntax of a link_info( ) fragment received through the broadcast stream, according to an embodiment of the present invention;

DETAILED DESCRIPTION OF EXEMPLARY EMBODIMENTS

Figure 1A:
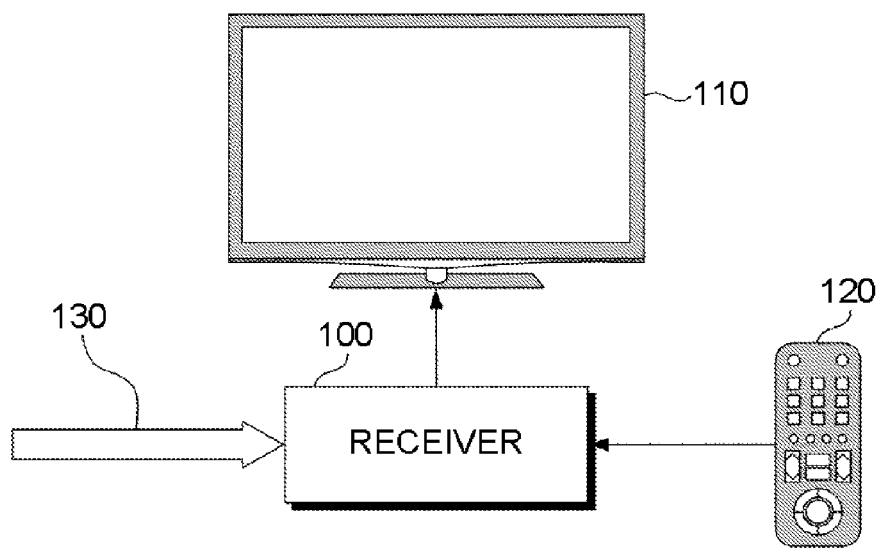
FIGS. 1A and 1B illustrate an apparatus for receiving a broadcast stream, according to an embodiment of the present invention.
Figure 1B:
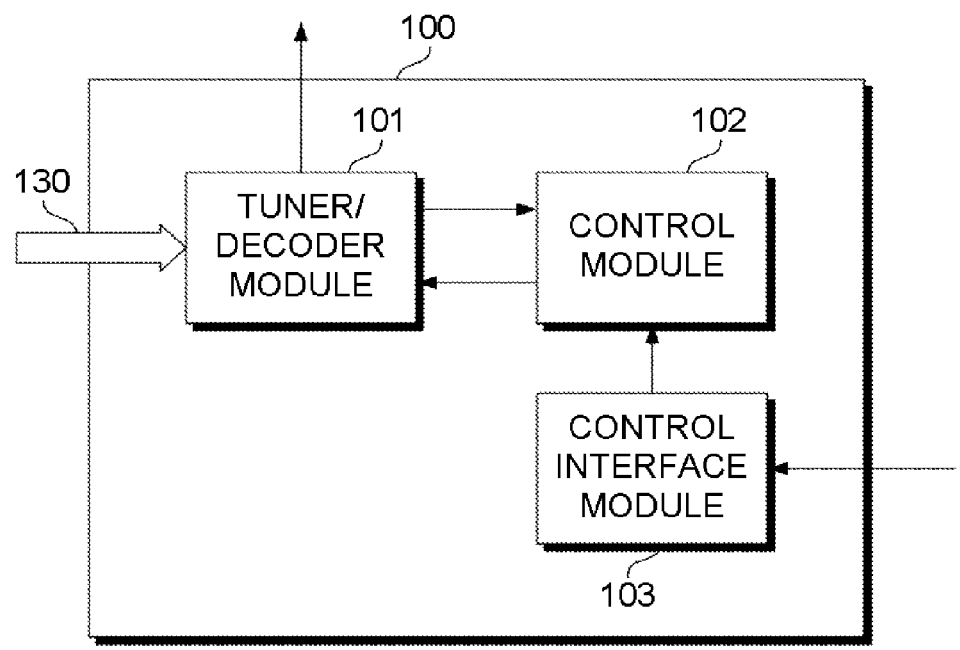

Referring now to FIGS. 1A and 1B, an apparatus for receiving a broadcast stream is illustrated, according to an embodiment of the present invention. In the present embodiment the apparatus is a Digital Video Broadcasting (DVB) compliant receiver 100, which is connectable to a television 110 to display a programme currently being received through the broadcast stream, and controllable by a remote control 120. The receiver 100 receives a broadcast stream 130 that includes a plurality of programmes broadcast across a plurality of channels. The receiver 100 tunes to a particular channel to receive audio-visual data of a programme currently being broadcast on that channel, decodes the audio-visual data to be displayed, and sends the decoded audio-visual data to the television 110 to be presented to a user. The user can control the receiver 100 using the remote control 120, for example to change the channel to which the receiver 100 is tuned.

In the present embodiment, the remote control 120 is similar to a conventional television remote control, and includes a plurality of keys which when pressed by a user cause the remote control 120 to transmit one of a plurality of control signals to the receiver 100. The control signal indicates which one of the keys was pressed. In another embodiment, instead of a plurality of keys, the remote control 120 may include a touchscreen for displaying a user interface having a plurality of user input regions. For example, instead of a dedicated remote control as shown in FIG. 1A, the apparatus may receive the control signals from a mobile device such as a smart phone or tablet computer.

Continuing with reference to FIG. 1B, in the present embodiment the receiver 100 includes a tuner/decoder module 101, control module 102, and control interface module 103. The structure shown in FIG. 1B is exemplary only, and the present invention is not limited to this structure. The modules may be physically separate, or may for example be implemented as software modules executed on a processor. In other embodiments, the functionality of the various modules shown in FIG. 1B may be combined into or divided amongst one or more other modules, as required.

In the present embodiment, the tuner/decoder module 101 is configured to receive and demodulate the broadcast stream 130, tune to a particular channel, and decode the audio-visual data of a programme currently being broadcast on the tuned channel. The tuner/decoder module 101 then sends the decoded audio-visual data to the television 110. In addition, the tuner/decoder module 101 is configured to extract metadata from the broadcast stream 130.

Conventionally, a broadcast stream may include metadata containing information about programmes that are available in the broadcast stream. For instance, in a DVB system, link information can be transmitted in a Related Content Table (RCT) as defined in TS 102 323 section 10. The link information provides a link to content relating to a programme currently being broadcast. In the conventional DVB system, the RCT may be broadcast whilst a future programme is being trailed, in which case the link information is the CRID of the future programme. The RCT also contains additional information indicating that the content currently being broadcast is a trailer, and that the link information relates to the content being trailed. The RCT therefore allows a broadcaster to provide link information, along with additional information defining the relationship between the link and the content.

In embodiments of the present invention, the RCT may contain information relating to the programme currently being broadcast. This information may be generally referred to as "additional information", and includes information that enables the receiver to select one of a plurality of predetermined functions. For example, the additional information may include different types of link information, such as an Internet Uniform Resource Identifier (URI) or telephone number. In this case, the additional information also includes information about the type of link information that is currently available for a particular programme. The receiver 100 then selects the predetermined function that is appropriate for the particular type of link information.

As well as the additional information which allows the receiver 100 to select the predetermined function, in the present embodiment the metadata extracted by the tuner/decoder module 101 also includes key information. The key information identifies one of the plurality of control signals receivable from the remote control 120. The tuner/decoder module 101 is configured to send the key information and additional information to the control module 102.

The control module 102 is configured to select one of the plurality of predetermined functions based on the additional information. Specifically, the control module 102 can be pre-programmed to perform different functions for different types of data. Therefore when the control module 102 receives the additional information, the control module 102 can select one of the plurality of predetermined functions based on the type of data identified by the additional information.

Referring now to FIG. 2, the syntax of a link_info( ) fragment received through the broadcast stream is illustrated. The link_info( ) fragment 200 may be used to send the additional information through the broadcast stream, when the receiver is a DVB-compliant receiver. The link_info( ) structure is defined in detail in ETSI TS 102 822-3-1, and as such a detailed description will be omitted here to maintain brevity.

In the present embodiment, the term_id and how_related_classification_scheme_id fields 210 define the type of data being provided and its relationship with the current content. Specifically, different classification schemes may be used, and the how_related_classification_scheme_id field defines the scheme that is currently being used. The term_id contains a code defining the type of data being provided, and is interpreted using the classification scheme specified in the how_related_classification_scheme_id field. For instance, when the how_related_classification_scheme_id is "urn:tva:metadata:HowRelatedCS:2010", a term_id of "10.2" denotes that the link information is a URL of a programme website, i.e. a website which contains additional information about the current programme or the broadcaster. It may be possible to signal multiple URLs with different or similar relationships for reception by receivers with differing capabilities.

The link information, or other type of data, may be carried in the media_uri_byte field 220 or in a separate descriptor. In the present embodiment, link information is contained in the media_uri_byte field 220.

As described above, the receiver may be pre-programmed with a plurality of predetermined functions, which are each appropriate for a different type of data received through the broadcast stream. For instance, additional information relating to a selected programme may be received that includes link information of the type "URL of web application". Here, the receiver may determine that the additional information includes link information that is the URL of a web application related to the programme currently being broadcast. Accordingly, the predetermined function for a "URL of web application" may be to navigate to the specified URL, i.e. the URL contained in the link information, and execute a web-based application received from the URL.

Alternatively, when a different programme is selected, link information of a different type may be available. For instance, the additional information may specify that link information of the type "telephone number" is currently available. The predetermined function for "telephone number" link information may be to initiate a telephone call by dialling the number contained in the link information. For example, the apparatus may be included in a device such as a smart phone, which has the capability to initiate a telephone call.

A further type of link information can also comprise a URL, and the predetermined function may be to initiate a voice-over-IP (VOIP) conference call using the URL. This type of link information may be referred to as a "VOIP URL".

The present invention is not limited to these types of link information and functions. Other types could be added as appropriate, and the receiver programmed with other suitable predetermined functions.

Additionally, a broadcaster may use the additional information to signal how and when the selected function should be performed. For example, a receiver may be configured to only perform the function during a period when the link information is available in the RCT. That is, a user may only be allowed to access the web page whilst the link information still exists in the RCT being received through the broadcast stream. Furthermore, the broadcast can also define the trigger that the receiver should use to launch the web application. In more detail, the receiver may be configured to extract key information from the broadcast stream, which allows a broadcaster to dynamically define a key to which the receiver will respond by executing the selected predetermined function. The key information will now be described in more detail with reference to FIG. 3.

Figures 3, 4:
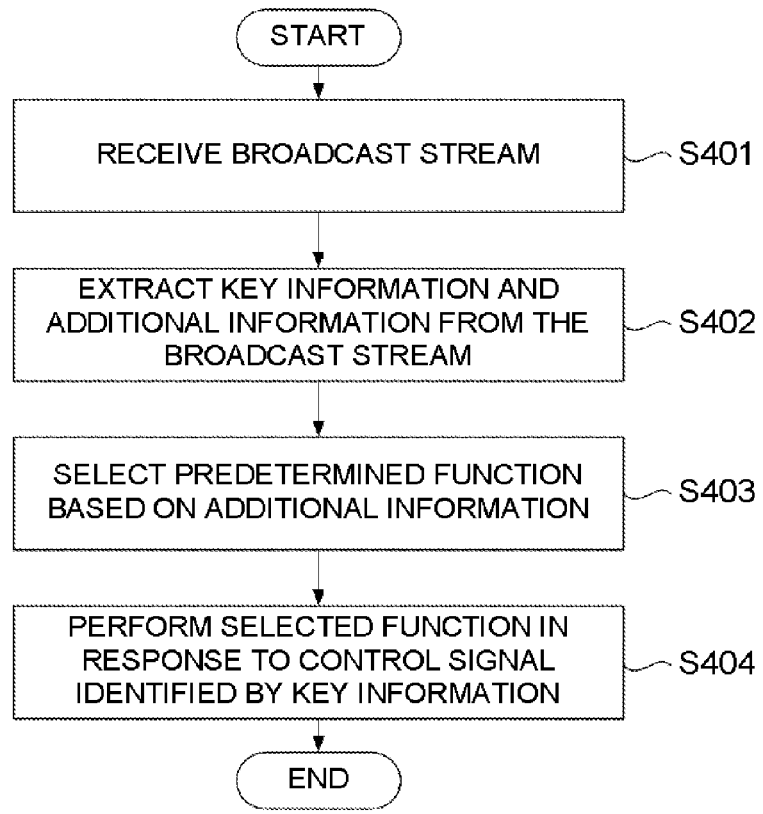
FIG. 3 illustrates the syntax of an activation_key_descriptor( ) received through the broadcast stream, according to an embodiment of the present invention.
FIG. 4 illustrates a method for use in an apparatus for receiving a broadcast stream, according to an embodiment of the present invention.

Referring now to FIG. 3, the syntax of an activation_key_descriptor( ) received through the broadcast stream is illustrated. In the present embodiment, a receiver is configured to receive the key information in the activation_key_descriptor( ) 300 shown in FIG. 3, although in other embodiments other formats may be used.

The activation_key_descriptor( ) 300 includes descriptor_tag and descriptor_length fields, which are standard fields used in all descriptors following the DVB standard. The descriptor_tag field is a unique value that identifies this descriptor as an activation_key_descriptor, whilst the descriptor_length field specifies the number of bytes that follow the descriptor_length field. The activation_key_descriptor further includes an activation_key_code field, which contains a value that identifies one of a plurality of control signals. In embodiments where the control signals are received from a remote control including a plurality of keys, each value corresponds to one of the keys of the remote control.

In more detail, a conventional television remote control includes RED, GREEN, YELLOW and BLUE keys. Of these, the RED key is normally used for interactive TV services and the BLUE key for audio selection. The yellow and green buttons are unused during normal TV reception and are therefore available for other actions. The value contained in the activation_key_code field indicates to which key the receiver should respond by performing the selected function. In the present embodiment, a value of 0x01 indicates the RED colour key, a value of 0x02 indicates the GREEN colour key, a value of 0x03 indicates the YELLOW colour key, a value of 0x04 indicates the BLUE colour key, and values of 0x00 and 0x05-0xFF are reserved for future use. These values and keys are given by way of example only, and the present invention is not limited to this particular arrangement.

In one embodiment, the receiver may be configured to monitor the RCT for link information that is a URL to a web page, i.e. of the "programme website" type. It will also look for the activation_key_descriptor to determine which control signal should be used to launch the web page. When a "programme website" link is available, the receiver may be configured to display an icon on the display to inform a user of the presence of the link. The particular icon to be used can be signalled as part of the RCT. Then when the user presses the remote control key identified in the activation_key_code field, the receiver is configured to respond by performing the selected function, which in this example comprises launching a web browser application and loading the web page using the URL.

Referring now to FIG. 4, a method for use in an apparatus for receiving a broadcast stream is illustrated according to an embodiment of the present invention. The method may be suitable for use in a receiver such as the one shown in FIGS. 1A and 1B. Firstly, in step S401, the apparatus receives a broadcast stream. This may comprise starting to receive a broadcast stream, or continuing to receive a broadcasting stream. Then, in step S402, key information and additional information are extracted from the broadcast stream. Next, in step S403, one of a plurality of predetermined functions is selected based on the additional information. For example, the additional information may define a type of other data, such as link information, and the function may be selected according to the type of data. Then, in step S404, the selected function is performed in response to a control signal identified by the key information. This step may comprise receiving a control signal, determining whether the control signal is the control signal identified by the key information, and performing the selected function if it is determined that the control signal is the one identified by the key information.

By determining which control signal to respond to based on the key information, the method enables a broadcaster to dynamically define a particular key of a remote control which can be used to perform the selected function. The broadcaster can also provide different types of data, for example link information, which will be treated differently by the apparatus.

Embodiments of the present invention have been described in which a selected function is executed at the receiver, for example executing a web-based application, displaying a webpage, or initiating a telephone call. However, in some embodiments, the receiver may be connectable to one or more secondary devices, for example smart phones and/or tablet computers, to send and receive information to/from the secondary devices. The receiver may, for example, connect to the secondary devices via a Wireless Local Area Network (WLAN). The receiver may receive target device information through the broadcast stream, which defines one or more devices on which a particular function should be performed. An example of such a system is shown in FIG. 5.

Figures 5, 6:
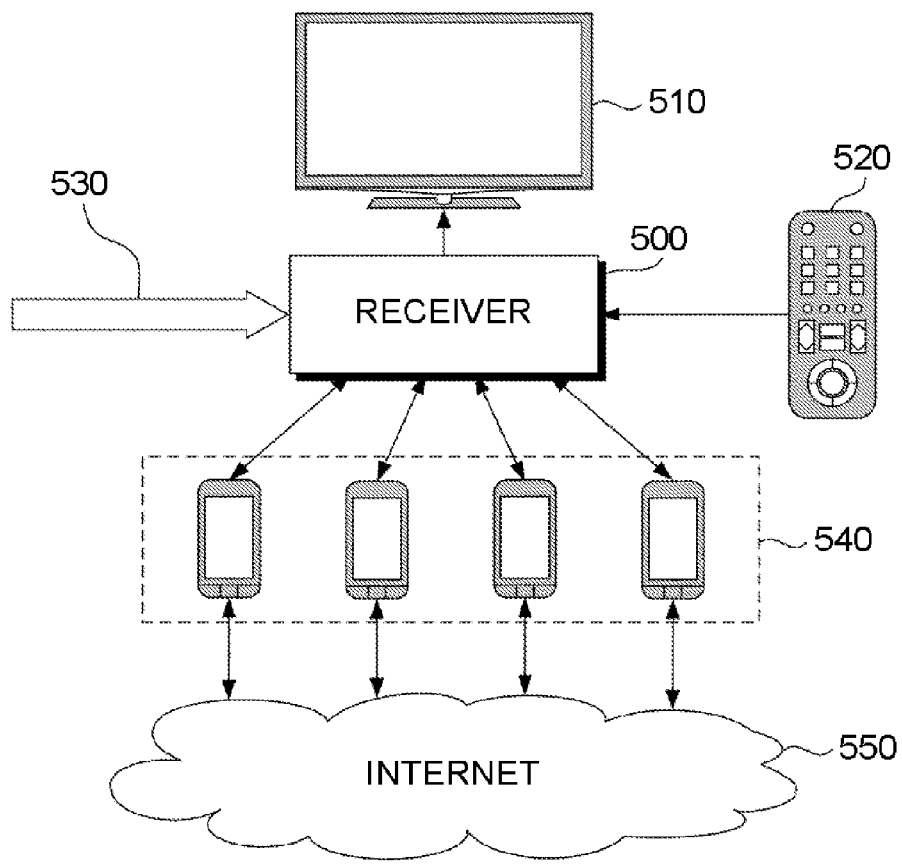
FIG. 5 illustrates a system including an apparatus for receiving a broadcast stream and a plurality of secondary devices connectable to the apparatus, according to an embodiment of the present invention.
FIG. 6 illustrates the syntax of a second_device_descriptor( ) received through the broadcast stream, according to an embodiment of the present invention.

Referring now to FIG. 5, the system comprises a receiver 500 which is connectable to a television 510 to display a programme, the receiver being controllable by a remote control 520. The receiver receives a broadcast stream 530. The television 410 and remote control 520 may be similar to those described with reference to FIG. 1A. In the present embodiment shown in FIG. 5, the receiver 500 is further configured to connect to one or more secondary devices 540, each of which can connect to the Internet 550. The connections between each secondary device and the receiver 500 and Internet 550 may be wired or wireless. In the present embodiment, the secondary devices are smart phones which are also configured to connect to a telephone network to initiate or receive telephone calls. In other embodiments, one or more of the secondary devices 540 may be another type of device, such as a tablet computer or desktop computer.

In a system such as the one shown in FIG. 5, a new Universal Plug and Play (UPnP) DLNA profile can be created to enable URL information to be pushed to one or more of the secondary devices 540 from the receiver 500. This profile may allow information received by the receiver, for example link information received through the broadcast stream, to be pushed to the secondary devices 540 on an ad-hoc basis. For example, the information to be transmitted to a secondary device may be a web URL. The receiver 500 may determine whether the secondary device is registered with the receiver 500 in order to receive data, and if the secondary device is registered, the receiver 500 may pass the URL to the secondary device in UPnP packets. The secondary device may be configured to initiate a browser session pointing at the URL contained in the received UPnP data packet, to automatically display a web page relevant to the current broadcast. The use of URL information is exemplary, and in other examples other types on information may be sent to the secondary devices 540.

Although in the present embodiment UPnP packets are used to transmit data between the receiver 500 and secondary devices 540, in other embodiments other data transfer protocols may be used.

Referring now to FIG. 6, the syntax of a second_device_descriptor( ) received through the broadcast stream is illustrated, according to an embodiment of the present invention. In the present embodiment, a receiver is configured to receive the target device information in the activation_key_descriptor( ) 600 shown in FIG. 6, although in other embodiments other formats may be used.

The second_device_descriptor( ) 600 includes the standard descriptor_tag and descriptor_length fields, similar to the activation_key_descriptor( ) of FIG. 3. The second_device_descriptor( ) 600 further includes a target_device field of two bits, and a reserved field of six bits. In the present embodiment, the target_device contains a value that denotes which device or devices a web-based application is to be executed on. In more detail, in the present embodiment a value of 00 is reserved for future use, a value of 01 indicates that the application should be executed only on the receiver itself, a value of 10 indicates that the application should be executed only on the secondary device or devices, and a value of 11 indicates that the application may be executed on the receiver and/or the secondary device. The target device information may be used as an indicator of whether or not the application is suitable for, i.e. authored in such a way as to make editorial sense, the receiver itself or the secondary device. The receiver may be further configured to determine whether or not to control the secondary device to execute the application, based on information received from the secondary device about whether or not it is capable of executing the application.

Although the target device information has been described in relation to executing a web-based application, the target device information may also be used in the context of other types of link information. For example, the secondary device may be configured to render information such as a web page automatically without the need for any user interaction. Alternatively, for example if the link information is a telephone number, the receiver may be configured to display an icon on the television display that would prompt the user to press the key identified by the key information in order to dial the number. If the corresponding control signal was then received, the receiver would send the telephone number to the secondary device, which could be configured to automatically dial the number.

These functions are disclosed by way of example only, and in other embodiments other functionality may be provided, as appropriate for other types of link information.

By using the second_device_descriptor( ) 600, the broadcaster can indicate their intention for the application. For example the application may be designed to be displayed alongside or on top of the broadcast video and interact with the broadcast video, in which case the application should only be run on the receiver. Alternatively, the application might obscure the video if executed on the receiver, in which case the application should only be run on a secondary device. As a further option, the application may be suitable for executing on either device, for example if the application is designed to adapt its behaviour depending on the device on which it is executed.

In cases where the second_device_descriptor( ) 600 indicates that the application is only suitable for executing on a secondary device, the receiver may not itself execute the application but may instead display an icon on the display in order to inform a user of the availability of the application. The application may be launched on the secondary device using a different remote control key to the one identified by the key information.

Furthermore, in some instances an application may only be run conditional on other parameters. For example, a first application to be run on a secondary device may be reliant upon a second application running on the receiver. This could be the case where multiple secondary devices are provided to allow a plurality of users to participate in an interactive quiz, with their scores being transmitted to and collated by the receiver.

Figure 7:
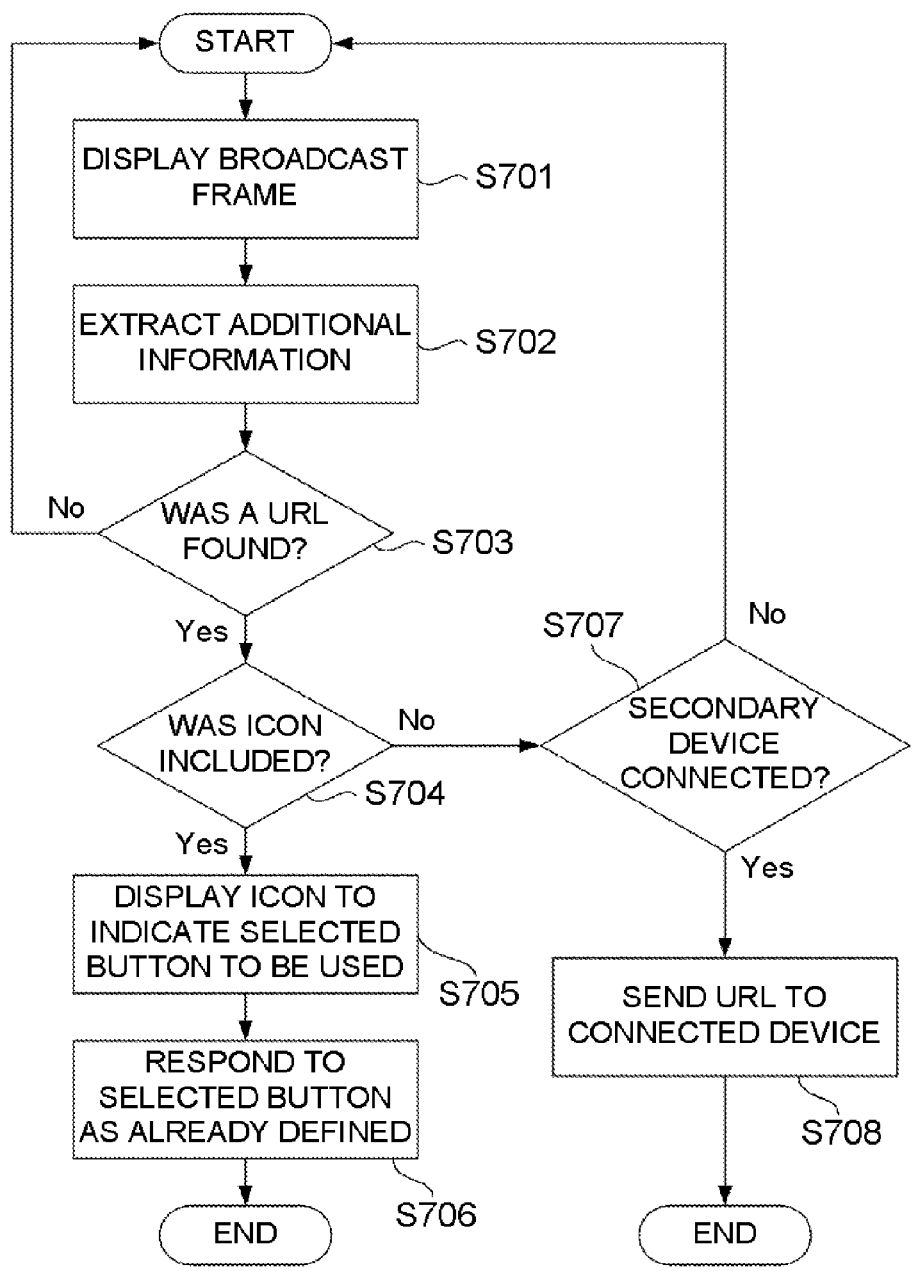
FIG. 7 illustrates a method for executing an application on a secondary device, according to an embodiment of the present invention.

Referring now to FIG. 7, a method for executing an application on a secondary device is illustrated, according to an embodiment of the present invention. The method may be suitable for use in an apparatus such as the receiver of FIG. 5, which is connectable to one or more secondary devices.

Firstly, in step S701, a broadcast frame of a currently selected programme is displayed. Secondly, in step S702, additional information is extracted from the broadcast stream. The additional information may include link information, and information about the type of link information that is available. The order of steps S701 and S702 may be reversed in some embodiments. Next, in step S703, it is determined whether link information comprising a URL was received. If a URL was not found, the receiver returns to the first step S701 and displays the next broadcast frame. If a URL was found, the receiver proceeds to step S704 and determines whether an icon was also found. The icon may be provided by the broadcaster, and should correspond to the remote control key identified by the key information.

If an icon was found, it is assumed that the application is only to be executed in response to user input. In this case, the receiver proceeds to step S705 and displays the icon. Here, the icon may, for example, be an image of the button which is to be used to launch the application. In other embodiments, other visual information instead of an icon, for example a textual description of the button, may be received from the broadcaster. The visual information allows a user to identify the button that has been specified by the key information, so that the user knows which button to press in order to perform the desired function. Then, in step S706, the receiver performs the selected function in response to the control signal corresponding to the specified key, i.e. the key identified by the key information and to which the visual information corresponds. In the present embodiment, the selected function comprises connecting to a location specified by the URL and executing a web-based application received from the location. However, in other embodiments, other functions may be selected as appropriate to the type of data. For example, the selected function may comprise displaying a web page specified by the URL, or dialling a specified telephone number.

If no icon was found at step S704, it is assumed that the application is to be automatically executed on the secondary device without user input. In this case, the receiver proceeds to step S707 and determines whether a secondary device is connected. This may comprise determining whether any secondary devices have registered with the receiver to receive data. If no secondary device is connected, it is not possible to launch the application, and so the receiver returns to the beginning. However, if a secondary device is connected, the receiver proceeds to step S708 and sends the URL to the secondary device, which may be configured to automatically navigate to the URL to receive the application, and execute the application. In situations where a plurality of secondary devices are connected, the receiver may transmit the URL to all connected devices, or may select one or more of the devices to which the URL should be sent.

In the embodiment of FIG. 7, a method is described in relation to executing a web-based application received from a location specified by a URL. However, in other embodiments a similar method may be used for different types of data, for example when the additional information includes a telephone number.

Embodiments of the present invention have been described in which link information is received through the broadcast stream as metadata. However, the present invention is not limited to this arrangement. In other embodiments, additional data such as the link information may be extracted directly from audio-visual data of the currently selected programme, in addition to or instead of receiving information through the broadcast stream as metadata. The information obtained from the audio-visual data may be used in a similar manner to the information received as metadata, for example may be used by a receiver such as the one shown in FIG. 1A or FIG. 5. A method of extracting information directly from video data is shown in FIG. 8.

Figure 8:
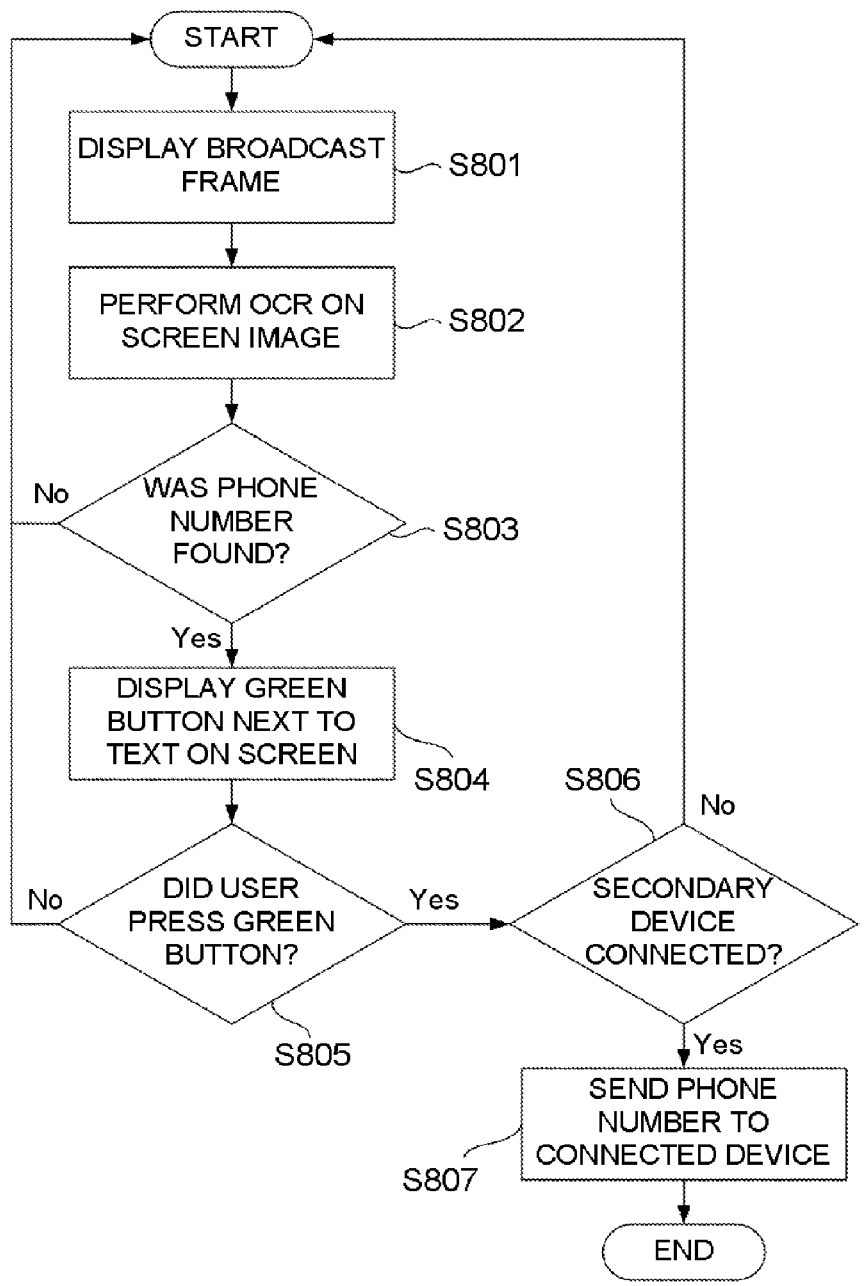
FIG. 8 illustrates a method of extracting information from video data of a selected programme, according to an embodiment of the present invention.

Referring now to FIG. 8, a method of extracting information from video data is illustrated, according to an embodiment of the present invention. The method may be suitable for use in a receiver such as the one shown in FIG. 5. Firstly, in step S801, a broadcast frame is displayed, i.e. a frame of a currently selected programme is displayed using the decoded video data of the programme. Then, in step S802, a screen image is obtained by taking a screen capture of the currently displayed broadcast frame. The screen image may be obtained automatically, or may be obtained in response to user input. For example, the receiver may be configured to capture a screen image when the user presses the yellow button of the remote control. This allows a user to select to extract information such as a phone number when they see the information appear on the screen. The captured image may then be processed immediately, or stored for later processing. Next, an optical character recognition (OCR) algorithm is applied to the screen image. After applying OCR to the screen image, textual information contained in the image is obtained. The receiver analyses the textual information and any string resembling a phone number is detected. The receiver may employ an algorithm that can distinguish telephone numbers from other text by recognising standard telephone number formats. The OCR algorithm may also be configured to detect other forms of text, for example names and/or addresses.

Next, in step S803 it is determined whether any phone number was found. If no phone number was detected, the receiver returns to step S801 and displays the next broadcast frame. If a phone number was detected, the receiver proceeds to step S804, and locates the text on the screen and controls the television to display an image of the green button next to the text. Then, in step S805, it is determined whether the user has pressed the green button, by waiting for the control signal corresponding to the green button. If the button is not pressed, the receiver returns to step S801 and displays the next broadcast frame. If the button is pressed, then the receiver proceeds to step S806 and checks whether a secondary device is currently connected. If no device is connected, the receiver returns to step S801 and displays the next broadcast frame. If a device is connected, the receiver proceeds to step S807 and sends the phone number to the secondary device. The secondary device may, for example, be configured to automatically dial the number, dial the number in response to other user input, or store the number for future use. Here, the use of the green button is merely exemplary, and in other embodiments other buttons may be used to select an information item.

Although in the method of FIG. 8 a phone number is detected, the receiver could be configured to detect other forms of text, for example names and/or addresses. Also, although in FIG. 8 the extracted information is sent to a secondary device, in other embodiments the extracted information may be used by the receiver itself. For example, if the receiver has the capability to connect to a telephone network and initiate telephone calls, the receiver may itself dial the telephone number. Also, in other embodiments images may be extracted as well as, or instead of, textual information. For example, an edge-detection algorithm may be employed to detect the edges of an object, with the enclosed area being saved as the image.

Additionally, in FIG. 8 the extraction of information is carried out by the receiver. However, in other embodiments, the receiver may send audio-visual data, or a screen image captured from the decoded video data, to a secondary device to be processed. In this case, the data could be sent in compressed format such as a .zip or .png file, or a fingerprint of the audio-visual data could be determined and transmitted.

In another embodiment, instead of performing OCR and extracting a phone number as described in relation to FIG. 8, the receiver may respond to user input by using electronic programme guide (EPG) information to identify the current programme. In more detail, the EPG information may be retrieved from the broadcast stream, and the receiver can use the current time and the currently tuned channel to identify the programme. Information identifying the programme, for example a programme identifier (CRID) can then be sent directly to the secondary device. In this way, the secondary device can identify the programme that is currently selected. The secondary device may be further configured to connect to a server, transmit the CRID, and receive further information relating to the current programme. This further information could include new URLs and telephone numbers. The further information may be used by the secondary device, for example by displaying the information to a user, or may be transmitted back to the receiver to be displayed on the television.

As described above with reference to FIG. 8, when a screen image is captured it may be stored by the receiver. Once an image has been stored, it can be retrieved later in response to user input, for post processing of the image. A method of post-processing a stored image will now be described with reference to FIG. 9.

Figure 9:
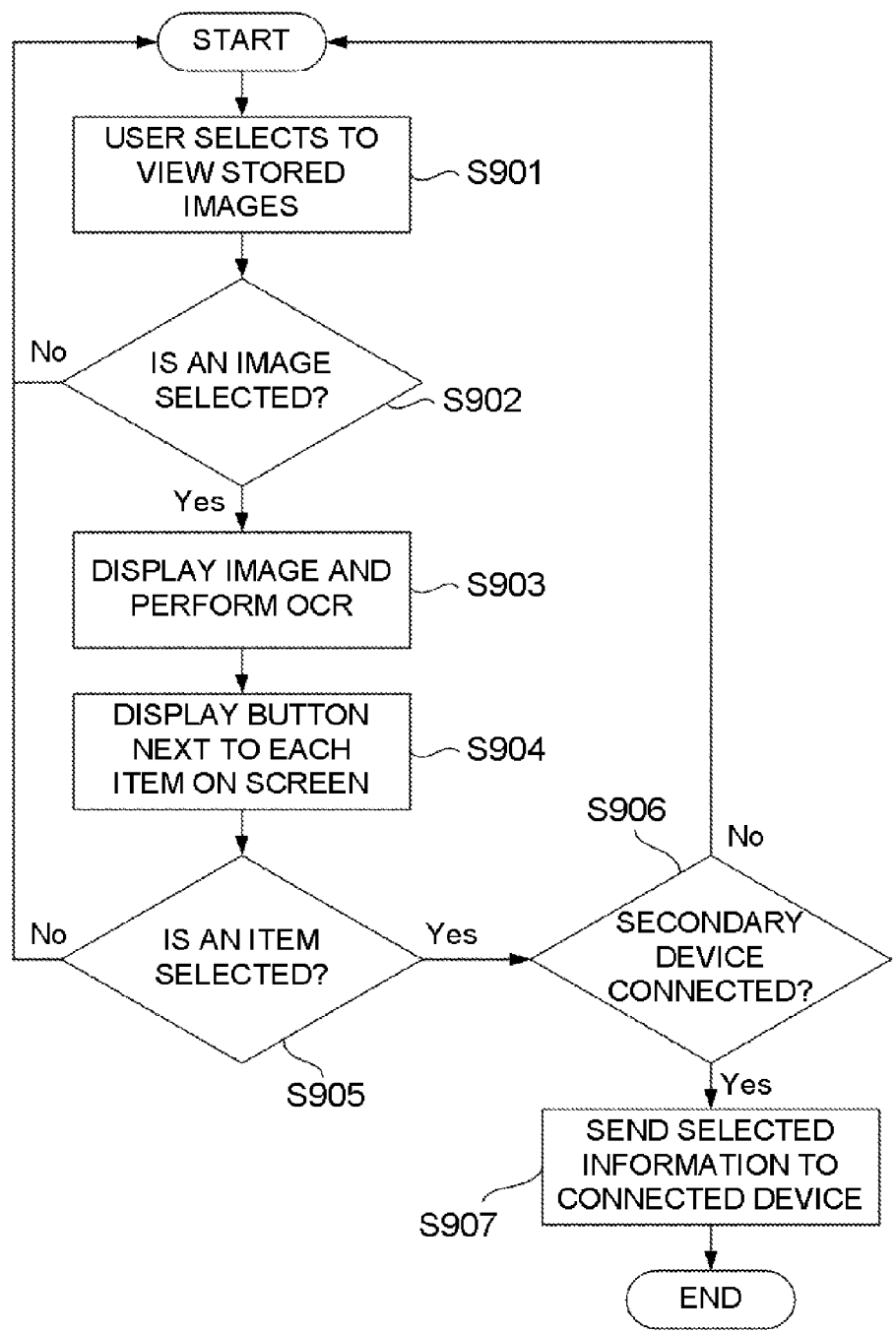
FIG. 9 illustrates a method of post-processing a stored image, according to an embodiment of the present invention.

Referring now to FIG. 9, a method of post-processing a stored image is illustrated, according to an embodiment of the present invention. The method may be suitable for use in a receiver such as the one shown in FIG. 1A or FIG. 5. Firstly, in step S901, the receiver receives a control signal that indicates that a user has selected to view images that are stored in the receiver. The receiver displays a user interface for selecting one of the images to be processed. Next, in step S902, it is determined whether one of the stored images has been selected. If not, the receiver returns to the beginning. If an image is selected, the receiver proceeds to step S903 and displays the selected image and performs OCR on the image. Here, the receiver may apply the OCR in a similar way to that described with reference to FIG. 8. A plurality of information items, such as phone numbers, addresses, dates and times may be identified by the OCR algorithm. Then, in step S904, the receiver highlights each information item on the displayed screen image, and also displays an image of a button of the remote control next to each information item. A user can press the button indicated next to each item to select that information item.

Then, in step S905, it is determined whether the user has selected one of the information items. If not, the receiver returns to the beginning. If an item is selected, it is determined in step S906 whether a secondary device is connected. If no device is connected, the receiver returns to the beginning. If a device is connected, the receiver proceeds to step S907 and transmits the selected information item to the secondary device.

Examples of types of information items that may be extracted include, but are not limited to, a telephone number, website URL, contact address, date and time, voucher code, still image, subtitle information, audio data, and tracking information. In the case of a telephone number, this can be sent directly to the secondary device, which can be configured to dial the number or store it for future use. In the case of a website URL, this can be sent to the secondary device, which can be configured to launch a web browser and display the specified web page. In the case of a contact address, this can be sent to the secondary device as a business card that can be stored in a memory of the secondary device. In the case of a data and time, this data can be sent to the secondary device as an appointment to be stored in the device's calendar. In the case of a voucher code, this can be sent to the secondary device, which can be configured to send the code to a specified web server along with a current cell ID, i.e. an ID of a mobile communications mast to which the device is currently connected, to find local offers which can be displayed in a web browser. In the case of a still image, the image can be sent to the secondary device, which may display the image and/or send it to a picture search engine. The secondary device can then receive information including search results relating to the image, and either display the information on the secondary device or send it back to the receiver to be displayed on the TV. In the case of subtitle information, this can be sent to the secondary device along with the still image to provide additional textual information for use in searching the image database. In the case of audio data, this can be extracted from audio-visual data of a selected programme, for example a recorded programme, and be sampled before being sent to the secondary device for use in identifying any images. In the case of tracking information, the secondary device may use object tracking to assist in identifying the still image if the original image is not of sufficiently high quality to be used for identification.

Embodiments of the present invention may be used to provide an augmented reality effect. For instance, when an object of interest is displayed in the broadcast picture, the user may select to isolate the image using a method similar to the one shown in FIG. 8, and using image recognition processing instead of OCR. The receiver can be configured to isolate the image and sent it to a secondary device, which in turn can be configured to query an online database to receive further information regarding the image. This further information can be sent back to the receiver to be displayed on the screen, or could be displayed on the secondary device whilst it is detected that a camera of the secondary device is pointed towards the display. As an example, an image of a car may be displayed in the broadcast programme, and the car image can be extracted and sent to the secondary device. The secondary device then sends the image to an online database and retrieves the price details, performance figures and local dealership information for the car. The information is then sent back to the receiver, which superimposes the information on top of the car image. The user may select the phone number from the dealership information and control the receiver or secondary device to make a call to the phone number.

In embodiments of the present invention in which secondary devices are able to connect to a receiver to receive information relating to a programme currently being displayed, each secondary device may be configured to register with the receiver in order to receive information. Specifically, each device may only register with the receiver if it determines that it is currently within the vicinity of the television, such that a user of the secondary device is likely to be viewing and/or listening to the programme. To determine whether it is in the vicinity, each secondary device may execute an automatic recognition procedure.

In more detail, the secondary device may include a microphone and/or camera. The apparatus can record first audio and/or video data of the selected programme during a predetermined time period, and send the recorded first audio and/or video data to the secondary device. Next, or at the same time, the secondary device may record second audio and/or video data during a time period corresponding to the predetermined time period. The secondary device can then determine a correlation value between the second audio and/or video data and the first audio and/or video data received from the apparatus, and register with the apparatus to receive information if the correlation value is above a threshold value. Filtering may be applied to the second audio and/or video data before obtaining the correlation value.

Embodiments of the present invention have been described in which a web URL is signalled in a link_info( ) fragment. However, in other embodiments, a web URL or other information could be signalled in the Application Information Table (AIT) defined in ETSI TS 102 809. In this case, the key information would also need to be added to the AIT, for example using the activation_key_descriptor.

Embodiments of the present invention offer an advantage that because a receiver is pre-programmed with a plurality of functions, it is not necessary to transmit an application to be executed over the broadcast stream. Instead, embodiments of the present invention may only be required to receive key information and additional information, such as link information, thereby reducing the volume of data that has to be sent through the broadcast stream. Also, embodiments of the present invention may allow a broadcaster to direct a user to a website automatically. Furthermore, other content such as telephone numbers may be sent to the receiver, for example to allow a user to initiate a telephone call by pressing a button on their TV remote control. Embodiments of the present invention can therefore allow a broadcaster to provide a more interactive experience by providing a user with different types of information during a live broadcast.

Although embodiments of the present invention have been described with relation to a DVB-compliant receiver, the present invention may be generally applicable to any apparatus suitable for receiving a broadcast stream. The apparatus may be separate from the display, for example may be a set-top box or personal video recorder, or may be included in the display. In some embodiments, the apparatus may be included in a mobile device, for example a tablet computer or a mobile telephone handset, or in another personal computer such as a desktop or laptop.

Also, embodiments of the present invention have been described in which an apparatus receives control signals from a remote device, such as a remote control, smartphone or tablet computer. However, in certain other embodiments, the apparatus itself may include user input means, such as a plurality of keys or a touchscreen. In such embodiments, the control signals may be generated internally within the apparatus when a user manipulates the user input means.

Additionally, embodiments of the present invention have been described in which metadata relating to a programme currently being displayed is extracted from the broadcast stream. The metadata enables additional content to be accessed. However, in other embodiments, metadata may be extracted which relates to any selected programme, which may or may not be the programme currently being displayed. For example, whilst one programme is being displayed, the user may select a different programme in an electronic program guide (EPG). The receiver may then perform the appropriate function, for example displaying a webpage, in response to the control signal specified in the metadata for the selected programme.

Furthermore, although embodiments of the present invention have been described in relation to a DVB-compliant system, other embodiments of the present invention may be implemented according to a different standard, such as a digital video broadcasting (DVB) standard, Open IPTV Forum (OIPF) standard, or Digital Entertainment Content Ecosystem (DECE) standard.

Whilst certain embodiments of the present invention have been described above, the skilled person will understand that many variations and modifications are possible without departing from the scope of the invention as defined by the accompanying claims.

What is claimed is:

1. An apparatus for receiving a broadcast stream, the apparatus comprising:
 a processor; and
 a memory storing a computer program executed by the processor,
 wherein the processor is configured to:
  receive the broadcast stream comprising a program, additional information relating to the program, and key information corresponding to the additional information,
  extract the additional information and the key information from the broadcast stream, the additional information identifying a type of link information relating to a selected program and when a selected function is performed, and the key information identifying one of a plurality of control signals receivable from a remote control,
  display the extracted additional information in a manner of indicating a type of the extracted key information,
  receive a control signal from the remote control, and
  perform the selected function corresponding to the extracted additional information according to whether the received control signal corresponds to the extracted key information.

2. The apparatus of claim 1, wherein the additional information includes information indicating the type of link information that is currently available for the program, and wherein the processor is configured to select the function according to the type of the link information.

3. The apparatus of claim 2, wherein the processor is configured to determine whether the link information is available through the broadcast stream as metadata, and to extract the link information from audio-visual data of the program if the link information is not available through the broadcast stream.

4. The apparatus of claim 3, wherein the processor is configured to extract the link information from audio-visual data of the program by capturing a screen image and applying at least one of an Optical Character Recognition (OCR) algorithm and an image recognition algorithm to the captured screen image.

5. The apparatus of claim 4, wherein the extracted link information comprises a plurality of information items, and wherein the processor is configured to display a user interface for selecting one of the plurality of information items.

6. The apparatus of claim 5, wherein when the link information is an Internet Uniform Resource Locator (URL), the selected function comprises receiving an application from a location defined by the URL and executing the application, or comprises connecting to the location defined by the URL and displaying a webpage from the location on a display.

7. The apparatus of claim 6, wherein when the link information is a telephone number, the selected function comprises dialing the telephone number, or comprises sending a text message to the telephone number.

8. The apparatus of claim 7, wherein the apparatus is a Digital Video Broadcasting (DVB) compliant receiver, and the key information and additional information are included in a Related Content Table (RCT) received through the broadcast stream.

9. The apparatus of claim 8, wherein the link information is included in a link_info fragment of the RCT, and the type of the link information is specified by a how_related_classification_scheme_id field of the link_info fragment.

10. The apparatus of claim 1, wherein the additional information includes target device information identifying one or more devices on which the function is to be performed, and
 wherein if the target device information identifies the apparatus, the processor is configured to perform the function, and if the target device information identifies a secondary device, the processor is configured to control the secondary device to perform the function.

11. A method comprising:
 receiving a broadcast stream comprising a program, additional information relating to the program, and key information corresponding to the additional information;
 extracting the key information and the additional information from the broadcast stream, the additional information identifying a type of link information relating to a selected program and when a selected function is performed, and the key information identifying one of a plurality of control signals receivable from a remote control;

displaying the extracted additional information in a manner of indicating a type of the extracted key information;
receiving a control signal from the remote control; and
performing the selected function corresponding to the extracted additional information according to whether the received control signal corresponds to the extracted key information.

12. The method of claim 11, wherein the additional information includes information indicating the type of link information that is currently available for the program, and
wherein the performing comprises selecting the function according to the type of the link information.

13. The method of claim 12, further comprising:
determining whether the link information is available through the broadcast stream as metadata; and
extracting the link information from audio-visual data of the program if the link information is not available through the broadcast stream.

14. The method of claim 13, wherein the extracting the link information comprises capturing a screen image and applying at least one of an Optical Character Recognition (OCR) algorithm and an image recognition algorithm to the captured screen image.

15. The method of claim 12, wherein when the link information is an Internet Uniform Resource Locator (URL), the selected function comprises receiving an application from a location defined by the URL and executing the application, or comprises connecting to the location defined by the URL and displaying a webpage from the location.

16. The method of claim 11, wherein the additional information includes target device information identifying one or more devices on which the function is to be performed,
wherein if the target device information identifies an apparatus, the function is performed on the apparatus, and if the target device information identifies a secondary device, the function is performed on the secondary device.

17. The method of claim 11, wherein the function comprises transmitting information relating to the program to a secondary device.

18. The method of claim 17, further comprising:
identifying the program,
wherein the information relating to the program comprises information identifying the program.

19. The method of claim 18, wherein the identifying the program comprises identifying the program based on a currently tuned channel, a current date and time, and Electronic Program Guide (EPG) information about programs available in the broadcast stream.

20. A method comprising:
receiving a broadcast stream;
extracting key information and additional information relating to a program selected by a control signal from the broadcast stream, the key information identifying one of a plurality of control signals receivable from a remote control associated with an apparatus for receiving the broadcast stream, and the additional information identifying a type of link information relating to a selected program and when a selected function is performed;
selecting one of a plurality of predetermined functions based on the additional information; and
performing the selected function in the apparatus for receiving the broadcast stream, in response to the control signal identified by the key information,
wherein the additional information includes target device information identifying one or more devices on which the selected function is to be performed,
wherein if the target device information identifies the apparatus, the selected function is performed on the apparatus, and if the target device information identifies a secondary device, the selected function is performed on the secondary device,
wherein the secondary device includes a microphone and/or camera, the method further comprising:
recording first audio and/or video data of the selected program during a predetermined time period, at the apparatus;
sending the recorded first audio and/or video data to the secondary device;
recording second audio and/or video data at the secondary device during a time period corresponding to the predetermined time period;
determining a correlation value between the second audio and/or video data and the first audio and/or video data; and
registering the secondary device with the apparatus to receive information if the correlation value is above a threshold value.

* * * * *